United States Patent

Jones et al.

[11] Patent Number: 5,656,184
[45] Date of Patent: Aug. 12, 1997

[54] METHOD OF LASER WELDING OPEN RECEPTACLES

[75] Inventors: Marshall Gordon Jones, Scotia, N.Y.; Joseph Criniti, New Britain; Joseph Schaaf, Plantsville, both of Conn.

[73] Assignee: General Electric Company, Schenectady, N.Y.

[21] Appl. No.: 411,091

[22] Filed: Mar. 27, 1995

[51] Int. Cl.⁶ .................................................. B23K 26/00
[52] U.S. Cl. .................. 219/121.64; 219/121.63
[58] Field of Search .................. 219/121.63, 121.64, 219/161

[56] References Cited

U.S. PATENT DOCUMENTS

| | | | |
|---|---|---|---|
| 2,716,691 | 8/1955 | Bowman | 219/61 |
| 4,527,040 | 7/1985 | Moon et al. | 219/121.64 |
| 4,574,176 | 3/1986 | Sharp | 219/121.64 |
| 4,636,606 | 1/1987 | Chastanet et al. | 219/121.63 |
| 4,680,443 | 7/1987 | Vere et al. | 219/121.64 |
| 4,681,396 | 7/1987 | Jones | 219/121.64 |
| 5,104,032 | 4/1992 | Spies et al. | 219/121.64 |
| 5,239,157 | 8/1993 | Sakano et al. | 219/121.64 |

FOREIGN PATENT DOCUMENTS

| | | | |
|---|---|---|---|
| 60-81843 | 5/1985 | Japan . | |
| 61-37389 | 2/1986 | Japan | 219/121.64 |
| 62-198136 | 9/1987 | Japan . | |
| 63-177983 | 7/1988 | Japan | 219/121.64 |

*Primary Examiner*—Geoffrey S. Evans
*Attorney, Agent, or Firm*—Marvin Snyder

[57] ABSTRACT

A laser is used within assembled component parts to create autogenous welds to produce a receptacle. This method requires no post-weld treatment. This laser welding is suitable to construct electrical distribution panel boxes.

20 Claims, 1 Drawing Sheet

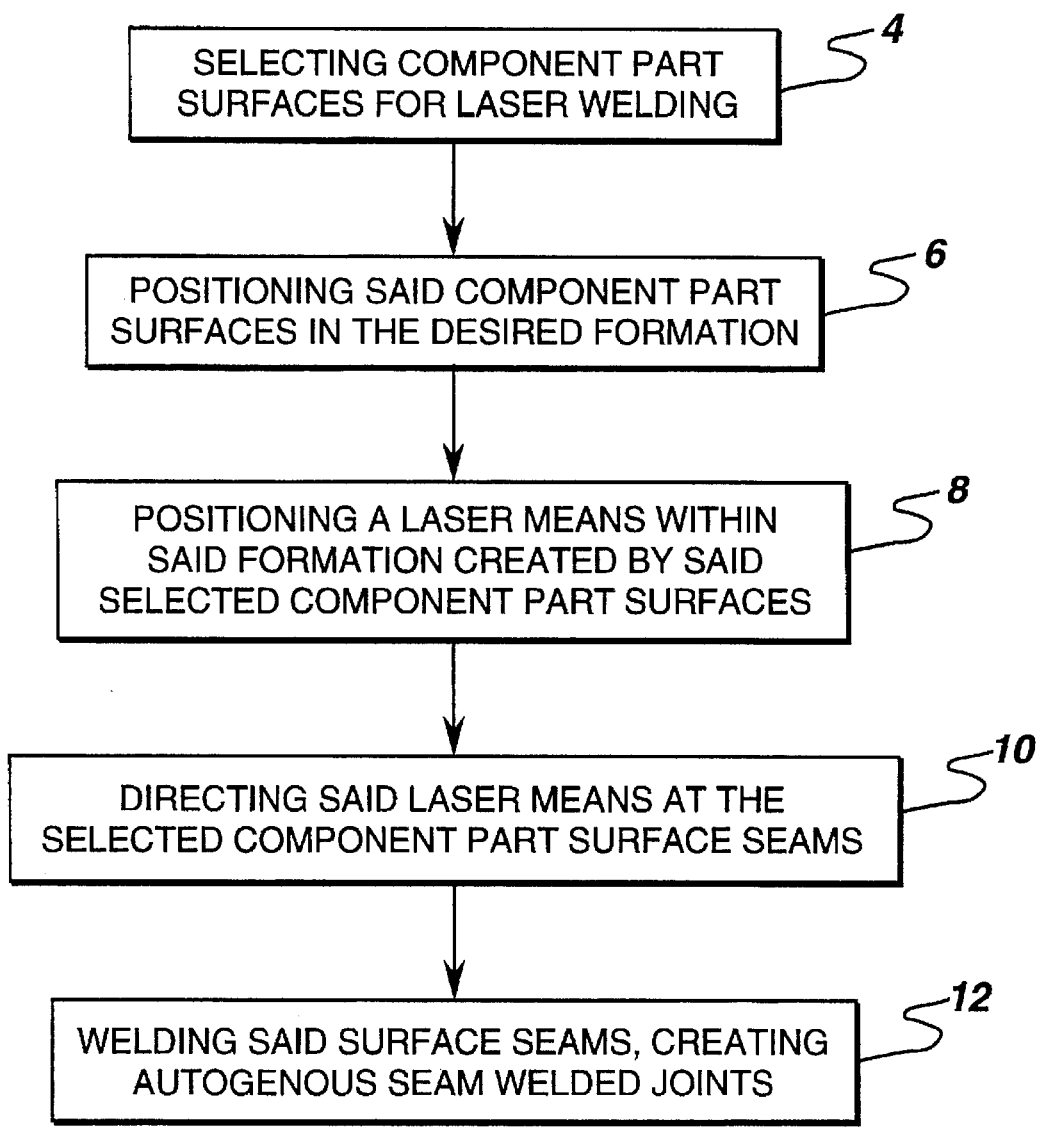

METHOD OF LASER WELDING OPEN RECEPTACLES

BACKGROUND OF THE INVENTION

This invention relates to a novel method of laser welding several component part surfaces together from within the formation created by said Component part surfaces. More particularly, said method of laser welding can be used to create a superior structural weld within electrical distribution panel boxes, or other receptacles, as compared to prior welding methods.

More traditional or standard welding methods, including metal-inert-gas (MIG), Tungsten-inert-gas (TIG), and arc welding, result in component parts which require rework. The necessary rework often includes flash elimination, component part straightening because of component distortion, and surface preparation for painting operations. This rework causes extra time and money to be expended during the manufacturing process and ultimately increases the overall component cost.

Even after rework is completed, the component parts may have less than optimal aesthetic attributes because the current procedures of welding often lead to unnecessary and aesthetically unpleasant depressions on the surface of the component part.

Furthermore, there is often an excess amount of silicone required in each component part to establish a fully watertight seal. The use of this excess silicone further adds to the manufacturing time and price.

Accordingly, there is a need for an improved welding method which would eliminate excess rework and silicone usage, and would be less intrusive allowing for a more aesthetically pleasing appearance of the completed part, while effectively welding the edges of the component part surfaces. This improved welding method would save time and money during manufacturing, and inevitably would create an overall cost savings for the consumer. It is the purpose of this invention to fulfill these and other needs in the art in a manner more apparent to the skilled artisan once given the following disclosure.

SUMMARY OF THE INVENTION

The above-mentioned needs are met by the present invention which relates to a novel method of laser welding several component part surfaces together from within the formation created by said component part surfaces. More particularly, said method of laser welding can be used to create a superior structural weld within electrical distribution panel boxes, or other receptacles, as compared to prior welding methods.

The preferred method of laser welding, according to this invention, offers the following advantages: good economy; ease of use; excellent speed; aesthetically improved component parts; no rework of component parts; and minimal silicone usage to obtain a water tight seal. In fact, in many of the preferred embodiments, these factors of economy; use; speed; aesthetics; rework; and minimal silicone usage, are optimized to an extent considerably higher than heretofore achieved in prior, known methods of laser welding.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with accompanying drawing figures in which:

FIG. 1 is a flow chart illustrating the required steps for the instant invention.

DETAILED DESCRIPTION OF THE INVENTION

Referring first to FIG. 1 of the drawings, a flow chart 2, briefly illustrates the method disclosed within the instant invention.

Specifically referring to flow chart 2, the first step to be taken in order to initiate the instant method is for the system user to select the component part surfaces for welding 4. For example, in an electrical distribution box, the selected component part surfaces would likely be comprised of panels of pre-formed cold rolled, stainless, or galvanized steel. The system user may for example, be a human and/or a computer having a computer-controlled robotic unit.

Next, the system user positions the component part surfaces into the desired formation 6. Said formation may be made with the aid of a mechanical assembling machine which holds the component parts together, often in an open box configuration, prior to welding.

The system user then positions a laser means within the formation created by said selected component part surfaces 8. If used, the mechanical assembling machine will position the to-be welded surface seams of the component parts, such that the laser means may project a beam so an effective weld joint may be formed. Said surface seams are defined as the preferred connective area of two component part surfaces. Said surface seams will be the location that will be laser welded using the instant method.

Said laser means should be a continuous wave (CW) $CO_2$ laser. A fiber delivered CW 1.06 µm wavelength laser, (e.g. Nd:YAG) may be substituted if sufficient power is available to meet through-put requirements. The use of this 1.06 µm wavelength laser would allow for a more flexible system. However, like the 1.06 µm wavelength laser, the 10.6 µm wavelength from a $CO_2$ laser couples well with cold rolled steel. Accordingly, lasers having similar characteristics to that of the $CO_2$ laser, may be effectively substituted. However, sufficient laser power should be maintained such that a smooth autogenous seam welded joint results.

Additionally, with proper part positioning and the appropriate laser parameters, a weld joint may be formed with less heat input than is necessary with standard welding techniques. This lower heat input leads directly to minimizing part distortion.

Next, said system user directs said laser means at said selected component part surface seams 10.

Finally, the system user employs the laser means to weld the surface seams 12, creating an autogenous seam welded joint that requires no post-weld treatment. This step may be controlled by a computer program set up to move the laser beam a set distance, close a laser beam shutter, then repeat the move and trigger operation a set number of times.

EXAMPLE

A test run of the instant invention involved the use of 12, 14, and 16 gauge cold-rolled, stainless, and galvanized steel samples. The samples were welded with a $CO_2$ laser. Certain welding speeds were determined by the experimentation. Representative sample weld speeds included 40–100 ipm for 14 gauge steel and 20–80 ipm for 12 gauge steel. The laser welded samples were evaluated and were found to be effectively welded. The welds were found to be leak proof and required no reparation before painting. The edge weld length was maximized such that the amount of silicone required was minimized. The corner locations are difficult to reach with the $CO_2$ laser, therefore silicone was used to seal the corners of the representative samples.

The foregoing has described several methods of laser welding. While specifics of the instant invention have been described, it will be apparent to those skilled in the art that various modifications thereto can be made without departing from the spirit and scope of the invention as defined in the appended claims.

What is claimed is:

1. A method of laser welding a receptacle having a plurality of panels, comprising the following steps:

positioning said panels to define an open receptacle having seams extending between corners;

positioning a laser means within said receptacle;

directing said laser means at the seams; and welding said seams between said corners, creating autogenous seam weld joints that require no post-weld treatment and no surface preparation for painting of said panels following said welding.

2. A method of laser welding in accordance with claim 1, further comprising the step of using a mechanical assembling machine to hold said panels together in an open box configuration prior to welding.

3. A method of laser welding in accordance with claim 1, wherein said panels are made of cold-rolled steel.

4. A method of laser welding in accordance with claim 1, wherein said panels are made of stainless steel.

5. A method of laser welding in accordance with claim 1, wherein said panels are made of galvanized steel.

6. A method of laser welding in accordance with claim 1, wherein said laser means is a 10.6 µm wavelength continuous wave $CO_2$ laser.

7. A method of laser welding in accordance with claim 6, wherein said panels are made of cold-rolled steel.

8. A method of laser welding in accordance with claim 6, wherein said panels are made of stainless steel.

9. A method of laser welding in accordance with claim 6, wherein said panels are made of galvanized steel.

10. A method of laser welding in accordance with claim 1, wherein said laser means is a fiber delivered continuous wave 1.06 µm wavelength laser.

11. A method of laser welding in accordance with claim 10, wherein said panels are made of cold-rolled steel.

12. A method of laser welding in accordance with claim 10, wherein said panels are made of stainless steel.

13. A method of laser welding in accordance with claim 10, wherein said panels are made of galvanized steel.

14. A method of laser welding electrical panel boxes comprising the following steps:

selecting panels for said laser welding;

positioning said panels in the desired formation;

positioning a laser means within said desired formation;

directing said laser means at the seams of said selected panels; and welding said seams, creating autogenous seam weld joints that require no post-weld treatment.

15. A method of laser welding electrical panel boxes in accordance with claim 14, wherein said laser means is a continuous wave $CO_2$ laser.

16. A method of laser welding electrical panel boxes in accordance with claim 14, wherein said laser means is a continuous wave 1.06 µm wavelength laser.

17. A method of laser welding electrical panel boxes in accordance with claim 14, further comprising the step of using a mechanical assembling machine to hold said selected panels together in an open box configuration prior to welding.

18. A method of laser welding electrical panel boxes in accordance with claim 15, wherein said selected panels are made of cold-rolled steel.

19. A method of laser welding electrical panel boxes in accordance with claim 15, wherein said selected panels are made of stainless steel.

20. A method of laser welding electrical panel boxes in accordance with claim 15, wherein said selected panels are made of galvanized steel.

* * * * *